US007299195B1

(12) United States Patent
Tawakol et al.

(10) Patent No.: US 7,299,195 B1
(45) Date of Patent: Nov. 20, 2007

(54) ACCEPTING BIDS TO ADVERTISE TO USERS PERFORMING A SPECIFIC ACTIVITY

(75) Inventors: Omar Tawakol, Bellevue, WA (US); Basem Nayfeh, Mercer Island, WA (US)

(73) Assignee: Revenue Science, Inc., Bellevue, WA (US)

( * ) Notice: Subject to any disclaimer, the term of this patent is extended or adjusted under 35 U.S.C. 154(b) by 548 days.

(21) Appl. No.: 11/049,228

(22) Filed: Feb. 1, 2005

Related U.S. Application Data

(63) Continuation of application No. 10/830,874, filed on Apr. 23, 2004, now abandoned, which is a continuation of application No. 10/653,703, filed on Sep. 2, 2003.

(51) Int. Cl.
*G06Q 30/00* (2006.01)
(52) U.S. Cl. .................... 705/14; 705/26; 705/27; 705/37
(58) Field of Classification Search ............ 705/14, 705/26, 27, 37
See application file for complete search history.

(56) References Cited

U.S. PATENT DOCUMENTS

| 5,974,398 | A | * | 10/1999 | Hanson et al. ............... 705/14 |
| 5,974,451 | A | | 10/1999 | Simmons |
| 6,078,866 | A | * | 6/2000 | Buck et al. ................... 702/2 |
| 6,317,761 | B1 | | 11/2001 | Landsman et al. |
| 6,324,519 | B1 | | 11/2001 | Eldering |
| 6,487,538 | B1 | | 11/2002 | Gupta et al. |
| 6,732,150 | B1 | | 5/2004 | Thrane |
| 6,804,659 | B1 | | 10/2004 | Graham et al. |
| 6,829,780 | B2 | * | 12/2004 | Kraft et al. ................... 725/42 |
| 6,832,207 | B1 | | 12/2004 | Shkedi |
| 6,937,996 | B1 | * | 8/2005 | Forsythe et al. .............. 705/16 |

(Continued)

FOREIGN PATENT DOCUMENTS

EP    1 026 610 A2    8/2000

(Continued)

OTHER PUBLICATIONS

Laurie J. FLynn, "With Goto.com's Search Engine, the Highest Bidder Shall Be Ranked First": Mar. 16, 1998: p. 5; col. 1; Business/Financial Desk.*

(Continued)

*Primary Examiner*—Jean D. Janvier
(74) *Attorney, Agent, or Firm*—Perkins Coie LLP

(57) ABSTRACT

A facility for Performing on-line advertising at a subject web site relative to a selected user activity is described. The facility receives a plurality of bids. Each bid is submitted on behalf of an advertiser, and specifies an advertising rate that the advertiser will pay to display an advertising messages to users performing the selected activity with respect to the subject web site. When a request for any web page of the subject web site containing advertising space is received from a user that has previously performed the selected activity, irrespective of the identity of the requested web page, the facility both (1) identifies the received bid specifying the largest advertising rate, and (2) causes an advertising message to be displayed in the advertising space of the requested web page for the advertiser on whose behalf the identified bid was submitted.

4 Claims, 5 Drawing Sheets

U.S. PATENT DOCUMENTS

| | | | |
|---|---|---|---|
| 6,983,272 | B2 * | 1/2006 | Davis et al. .................. 707/3 |
| 2001/0014876 | A1 | 8/2001 | Miyashita |
| 2001/0041566 | A1 | 11/2001 | Xanthos et al. |
| 2002/0007308 | A1 | 1/2002 | Anderson et al. |
| 2002/0124098 | A1 | 9/2002 | Shaw |
| 2003/0028451 | A1 | 2/2003 | Ananian |
| 2003/0055729 | A1 * | 3/2003 | Bezos et al. .................. 705/14 |
| 2003/0088465 | A1 | 5/2003 | Monteverde |
| 2003/0110080 | A1 | 6/2003 | Tsutani et al. |
| 2003/0110497 | A1 | 6/2003 | Yassin et al. |
| 2003/0200168 | A1 * | 10/2003 | Cullen et al. .................. 705/37 |
| 2004/0015397 | A1 * | 1/2004 | Barry et al. .................. 705/14 |
| 2004/0036622 | A1 * | 2/2004 | Dukach et al. .......... 340/691.6 |
| 2005/0091109 | A1 | 4/2005 | Howard et al. |

FOREIGN PATENT DOCUMENTS

| | | |
|---|---|---|
| JP | 2000228704 | 8/2000 |
| WO | WO-97/21183 A1 | 6/1997 |
| WO | WO 9834189 A1 * | 8/1998 |
| WO | WO-99/60504 A1 | 11/1999 |
| WO | WO-00/08802 A2 | 2/2000 |
| WO | WO-01/07985 A2 | 2/2001 |

OTHER PUBLICATIONS

All you wanted to know about online advertising (and were afraid to ask)(sic). "The Cost of Advertising on Web." www.northwestern.edu/~paritosh/links/online.html, Feb. 18, 2000.

B2B Business.net. "Advertising & Media Links." http://www.b2business.net/eMarketplaces/Major_Markets/Vertical_Industries/Advertising_%26_Media/, accessed Jul. 26, 2005.

Flynn, Laurie J. "Let's Make a Deal." *Context Fall 1998 Issue.* http://www.contextmag.com/setFrameRedirect.asp?src=/archives/199809/Feature1letsMakeaDeal.asp, accessed Jul. 25, 2005.

Global Information Network, LLC. "Gin Adnetwork." http://web.archive.org/web/19991128190514/www.ginadnetwork.com, accessed Jul. 26, 2005.

Gupta, Amit and Geoffrey Baehr. "Ad Insertion at Proxies to Improve Cache Hit Rates." Sun Microsystems Laboratories.

Hansell, Saul. "Big Web Sites to Track Steps of Their Users." The New York Times on the web. www.nytimes.com/library/tech/98/08/biztech/articles/16data.html, Aug. 16, 1998.

Morgan, Cynthia. "Porn Paves the Way for Web Site Profits." www.Computerworld.com/news/1999/story/0,11280,36825,00.html, Aug. 30, 1999.

Naor, Moni and Benny Pinkas. "Secure Accounting and Auditing on the Web." Weizmann Institute of Science. www.pinkas.net/PAPERS/www7paper/p336.htm, accessed Jul. 25, 2005.

NetPlus Marketing Monthly. "NetPlus Marketing Monthly Jul. 1999." www.netplusmarketing.com/Newsletter199907.shtml, accessed Jul. 26, 2005.

Newpoff, Laura. "AdOutlet.com Sees Market in Empty Advertising Space." Business First of Columbus. www.bizjournals.com/columbus/ stories/1999/06/14/dtory4.html, Jun. 14, 1999.

Novak, Thomas P. and Donna L. Hoffman. "New Metrics for New Media: Toward the Development of Web Measurement Standards." W3C Journal, www.w3j.com/5/s3.novak.html. Accessed Jul. 25, 2005.

Outdoor Media. "RFP Information." http://web.archive.org/web/20001109161600/http://www.onemediaplace.com, accessed Jul. 26, 2005.

Parker, Pamela. "Online Ad Industry Exchange Activity Heats Up." Internetnews. www.Internetnews.com/bus-news/print.php/332181, Mar. 31, 2000.

Perdue, Lewis. "Adauction Tragets Unsold Banner Space." Internetnews.com. www.internetnews.com/bus-news/article.php/193391, Sep. 1, 1999.

* cited by examiner

ACCEPTING BIDS TO ADVERTISE TO USERS PERFORMING A SPECIFIC ACTIVITY

CROSS REFERENCE(S) TO RELATED APPLICATIONS

This application is a continuation of U.S. patent application Ser. No. 10/830,874, filed Apr. 23, 2004, now abandoned which is a continuation of U.S. patent application Ser. No. 10/653,703, filed Sep. 2, 2003, both of which are hereby incorporated by reference in their entirety.

TECHNICAL FIELD

The present invention is directed to techniques for targeted on-line advertising.

BACKGROUND

A web site is a group of related web pages that are available for retrieval via the Internet or another computer network. Parties that maintain web sites are sometimes called "publishers." Some publishers sell to advertisers opportunities to include advertising messages on their web sites. For example, the publisher of a news web site may sell to an advertiser selling residential inspection services an opportunity to include advertisements on the publishers web site.

In particular, publishers often sell opportunities to include advertising on particular pages of publishers' web sites having special significance. For example, because residential inspection services may be valuable to people who are in the market for a house, the publisher of the news web site may sell to the residential inspection services advertiser an opportunity to include advertisements on pages of the publishers web site containing articles about real estate sales. As another example, the publisher may sell to the residential inspection services advertiser an opportunity to include advertisements on search result pages produced from user queries containing the search term "home sales."

Because some pages on a web site have more advertising significance than others, advertiser demand to include advertising messages on a particular web site may vary widely from one page of the web site to another. This is disadvantageous in several respects. First, more significant pages are oversubscribed, in that some advertisers that want to advertise there are unable to do so. Advertisers may have to forego receiving advertising revenue from advertisers that would have advertised on these pages if they were not oversubscribed. Second, less significant pages are undersubscribed, in that there are not enough advertisers that want to advertise on these pages to purchase all of the available advertising capacity there. In the case of these pages, the publisher either must sometimes serve the page without any advertising, generating no incremental advertising revenue, or must accept location-insensitive messages at a very low price.

Another disadvantage of this approach is that, while the fact that a particular user has requested retrieval of a page relating to a particular subject may in some cases accurately predict that the user will be interested in advertising related to a similar subject, the user often has no such interest. Accordingly, presenting advertising in this manner often has a fairly low level of effectiveness.

In view of the above-discussed disadvantage of conventional approaches to web advertising, a new approach that overcame these disadvantages would have significant utility.

SUMMARY

A software facility for presenting targeted advertising messages in a location-agnostic manner is described. In some embodiments, the facility determines that a number of users are part of a distinct audience, such as an audience sharing a common interest, based upon activities performed by these users while visiting a publisher's web site, also called the "subject web site." The facility specifies that the users in this audience will receive advertising messages relating to the nature of the audience, such as the audience's common interest, on any pages that these users subsequently visit on the publisher's web site.

DETAILED DESCRIPTION

Figure 1:
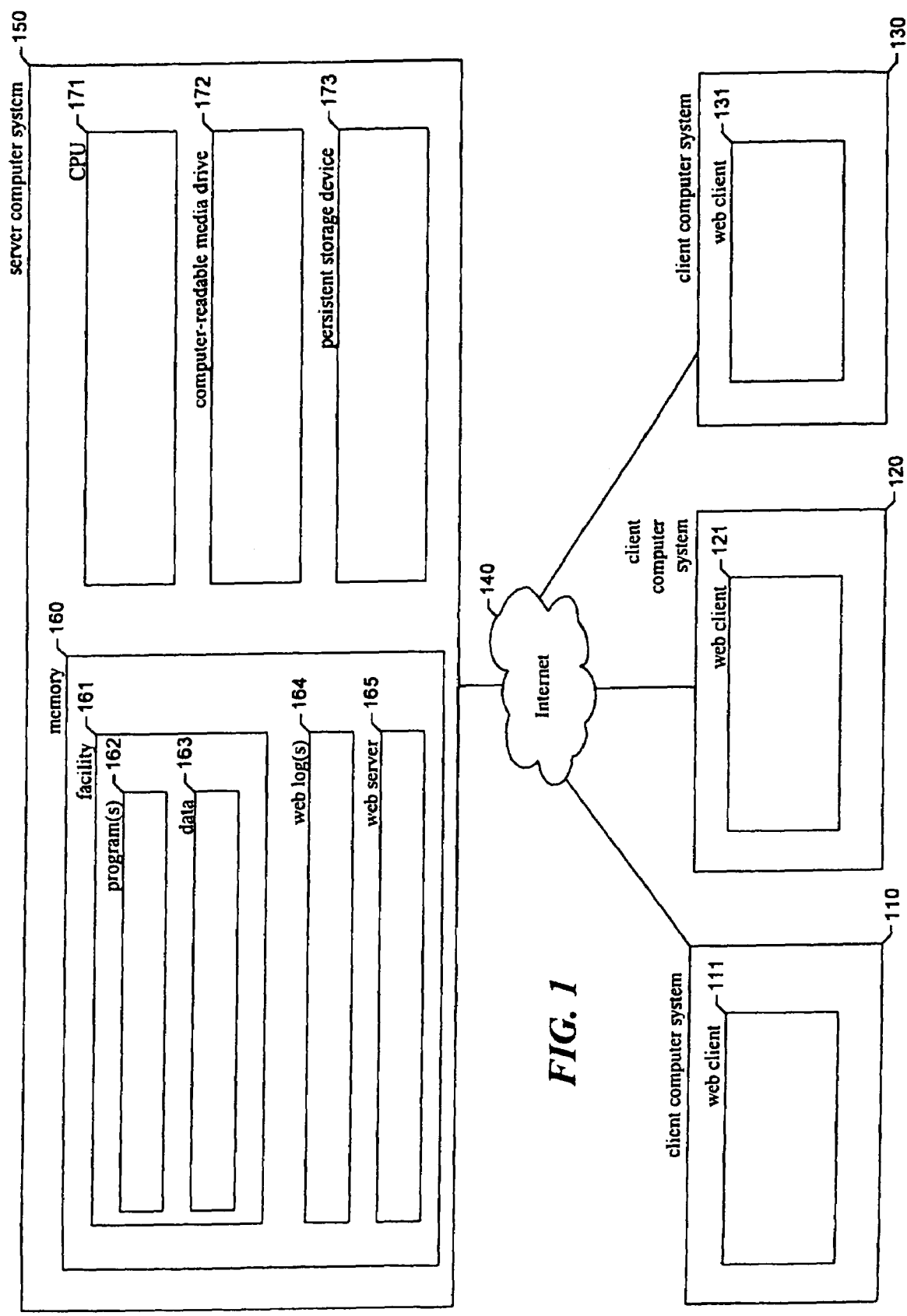
FIG. 1 is a high-level block diagram showing a typical environment in which the facility operates.

A software facility for presenting targeted advertising messages in a location-agnostic manner ("the facility") is described. In some embodiments, the facility determines that a number of users are part of a distinct audience, such as an audience sharing a common interest, based upon activities performed by these users while visiting a publisher's web site, also called the "subject web site." The facility specifies that the users in this audience will receive advertising messages relating to the nature of the audience, such as the audience's common interest, on any pages that these users subsequently visit on the publisher's web site.

The activities performed by users that qualify them as members of a particular audience can be of a number of different types. A first activity type is action-based activities, each of which involves performing a set of actions, such as interacting with a loan calculator made available by the publisher on its web site to obtain a loan calculator result. A second activity type is reading-based activities, each of which involves reading at least a minimum number of web pages containing a particular set of key words or matching a particular query. A third activity type is category-based activities, which involve visiting one or more specific categories of the publisher's web site with at least a minimum frequency.

In some embodiments, advertisers bid on opportunities to advertise to particular audiences. These bids are accepted from advertisers either by the publisher directly, or through an intermediary, such as an independent operator of the facility. When an advertiser submits a bid, the advertiser specifies such aspects as the identity of the audience; a rate per thousand impressions that the advertiser will pay to display advertising messages to members of the audience; a maximum amount of money that the advertiser is willing to spend; a date on which the advertising will conclude, irrespective of whether the budget has been exhausted; and an advertising message to be displayed. Where this auction system is used to sell advertising, when a user requests a page of the publishers web site, the facility identifies any audiences for which the user has qualified based upon the users activities on the publishers web site. The facility then selects bids for particular users based—at least in part—upon the advertising rates specified for the bids, and incorporates the advertising message specified by the selected bids into the requested pages. In some embodiments, the facility provides mechanisms other than auctions that enable advertisers to purchase opportunities to advertise to particular audiences. For example, in some embodiments, the facility accepts requests to advertise to particular audiences based upon a fixed price, or based upon a price automatically determined with reference to a variety of pricing factors.

In some embodiments, the facility auctions or otherwise sells opportunities to advertise to members of a particular audience during specific sessions, i.e., individual visits to the subject web site, also called "sessions." For example, in some such embodiments, the facility accepts bids for advertising opportunities that, in addition to audience identity and advertising rate, also specify a maximum number of advertising impressions to present per session. In these embodiments, the facility typically selects, at the beginning of each new session, a bid to use in advertising to the user visiting the subject web site during that new session. In some of these embodiments, the selected bid is the only bid for its audience that will be used to advertise to the user during the new session. Such bid selection is typically performed based upon expected values calculated for each of the bids, which may take into account each bid's advertising rate and maximum number of impressions per session, as well as an expected number of impression opportunities per session. This expected number of advertising opportunities may be determined manually by a human user, or may be calculated based upon data for all visitors to the subject web site, users in the same audience or audiences as the presently-visiting user, or the presently-visiting user as an individual. By selling session advertising opportunities as described above, embodiments of the facility are able to re-establish a sense of scarcity for advertising opportunities that may otherwise be lost when the facility dissociates advertising opportunities from specific web pages on the subject web site.

By presenting advertising messages in manners such as those described above, embodiments of the facility enable a publisher to obtain a number of valuable benefits. As one example, the use of rich activities to qualify users for audiences enables the publisher to sell better-targeted advertising at a higher average price. Further, because advertising messages can be presented to users of an audience on any page of the publisher's web site after these users have performed the activity that qualifies them for the audience, the publisher enables an advertiser to "follow" users in the audience, presenting a larger body of advertising messages to users in the audience as they navigate from page to page of the publisher's web site, both facilitating more effective advertising campaigns and making it likely that advertisers will purchase greater advertising volume from the publisher. Also, the fact that advertising messages can be presented to users of an audience on any page of the publisher's web site after these users have performed the activity that qualifies them for the audience improves the value of, and therefore the level of revenue produced by, pages on the web site that have less inherent advertising significance or less traffic. Additionally, the use of auctions to sell the advertising space adds the benefits of simplifying the purchase of advertising space, making such purchase accessible to a larger group of advertiser and maximizing the revenue obtained from each advertising opportunity.

FIG. 1 is a high-level block diagram showing a typical environment in which the facility operates. The block diagram shows several client computer systems, such as client computer systems 110, 120, and 130. Each of the client computer systems has a web client computer program that a user of the client computer system can use to browse the World Wide Web, such as web clients 111, 121, and 131. Such web clients typically allow web servers within particular domains to store data in a form called a cookie on a client computer system as part of the process of responding to a request from the web client on that client computer system. Such cookies may be used to store information uniquely identifying the client computer system and/or its user, among other information. The web client forwards the information stored in a cookie with each future request it makes to the domain that created the cookie. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains the facility 161, comprising one or more programs 162, as well as data 163. The memory preferably further contains a web server computer program 165 for delivering web pages in response to requests from web clients, as well as one or more logs 164 containing information about requests received and serviced by the web server. While items 161-165 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While various embodiments of the facility are described in terms in the environment described above, those skilled in the art will appreciate that the facility may be implemented in a variety of other environments including a single, monolithic computer system, as well as various other combinations of computer systems or similar devices connected in various ways. In particular, the facility may interact with users via a wide range of portable and/or wireless user interface devices, such as cellular telephones, pagers, personal digital assistants, etc.

Figure 2:
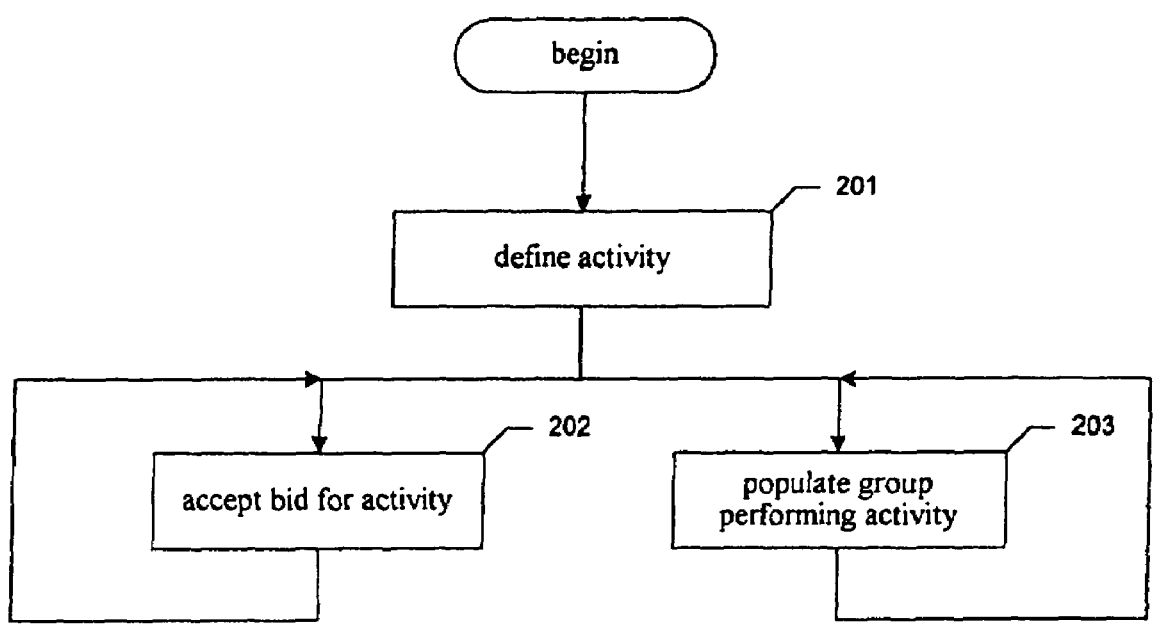
FIG. 2 is a flow diagram showing steps typically performed by the facility in order to add a new activity to those on which advertisers can bid.

FIG. 2 is a flow diagram showing steps typically performed by the facility in order to add a new activity to those on which advertisers can bid. Embodiments of the facility can perform these steps for each of a number of different activities. In step 201, the facility creates a definition of the new activity that may be automatically applied to identify users who have performed the activity. In some embodiments, the activity definitions created in step 201 are consistent with those described in U.S. Patent Application Nos. 60/479,353 and 60/479,609, both filed on Jun. 17, 2003, each of which is hereby incorporated by reference in its entirety.

The facility typically creates definitions of action-based activities based upon the input of a user, such as an on-line marketing specialist. The user typically selects one or more types of actions that must be performed as part of the activity, a number of times each of the actions must be performed, and an amount of time in which the required number of each of the actions must be performed.

The facility enables advertisers to manually define reading-based activities by specifying a group of key words that may be found on pages of the subject web site, or by specifying search queries built using logical operators that may be used to search the pages of the subject web site or an index thereon, such as the following:

"Ford" AND NOT ("Gerald" OR "President")
"Ford" NEAR "SUV"
"Ford" AND NOT "Chrysler"

A user performs such an activity by requesting at least a minimum number of pages of the subject web site containing the group of key words or satisfying the query within a particular period of time, or by requesting pages of the subject web site whose scores for satisfying the query sum to at least a minimum total score.

The facility can also automatically define reading-based activities by applying clustering algorithms and/or frequent set algorithms to data obtained from web logs identifying each request made for a particular page of the subject web site by a particular user at a particular time, in order to identify groups of pages of the subject web site where most or all of the pages of each group have been visited by each of a significant number of individual users. For each of these groups of pages, the facility compares the text appearing on each of the pages of the group to identify words or groups of words that occur on most or all of the pages of the group. In some embodiments, information retrieval techniques are applied to select those words or groups of words that both are contained by most or all of the pages of the group, and are contained by few or none of the pages of the subject web site that are not in the group. For some or all of these groups of pages, the facility creates a reading-based activity definition that requires users to visit a certain number of pages of the subject web site containing the words or sequence of words selected for the group, at least a minimum number of times in a specified period of time. The facility may permit a user, such as an on-line marketing specialist, to select groups that will be the basis for a reading-based activity, and specify the necessary parameters for each reading-based activity.

To create a definition for category-based activities, the facility receives input from a user, such as an on-line marketing specialist, identifying one or more categories of the subject web site, and specifying the number of pages in those categories that a user must visit to perform their activity, and the amount of time in which the user must visit them.

Figure 3:
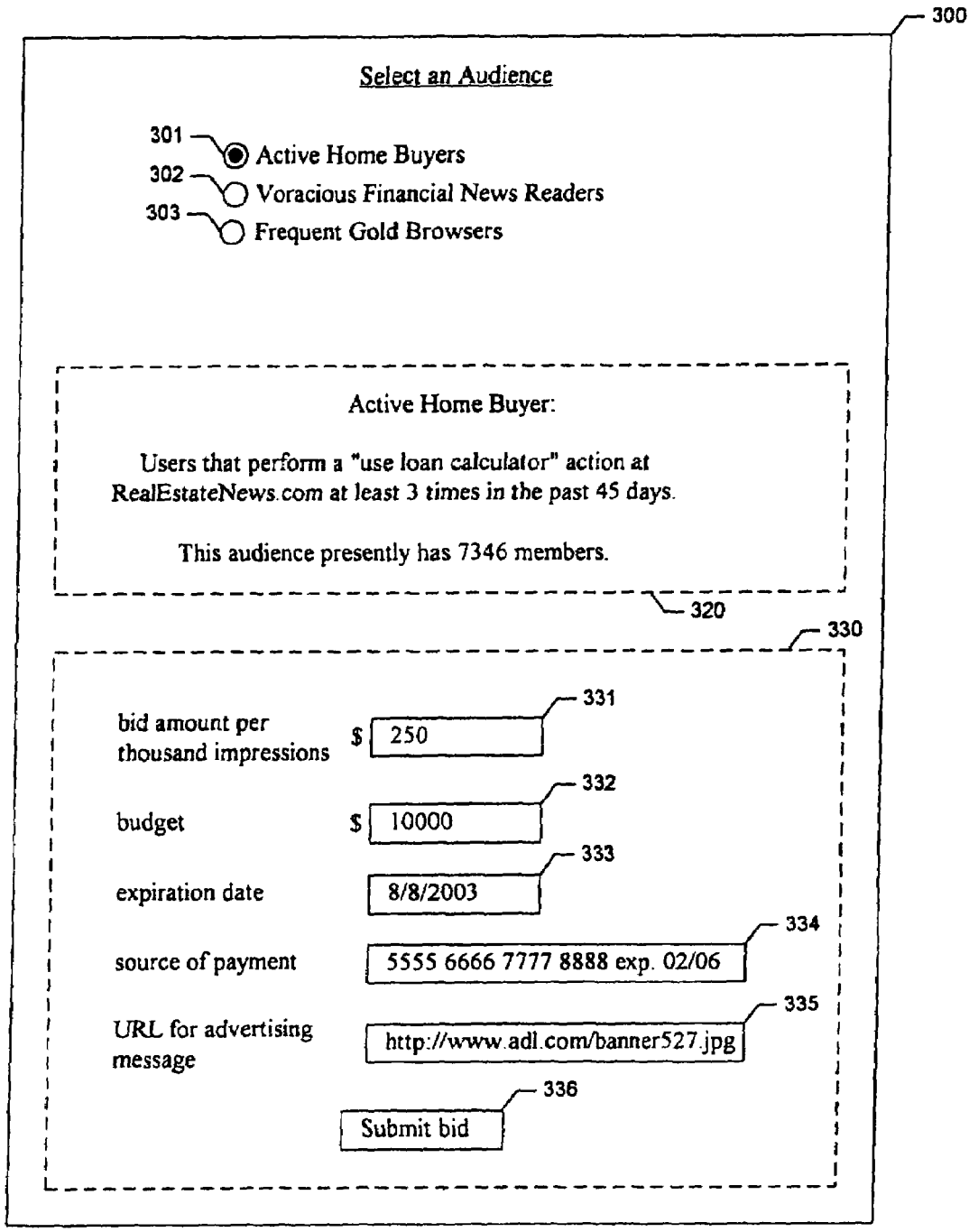
FIG. 3 is a display diagram showing a sample web page that advertisers may use in order to bid on an activity performed by users on the subject web site.

After step 201, the facility continues in both steps 202 and 203 in parallel. Those skilled in the art will appreciate that, while steps 202 and 203 are independent, enabling them to be performed in parallel, they need not be performed in a truly parallel manner, in the computer science sense. In step 202, the facility accepts a bid for the activity. FIG. 3, discussed below, shows details of one approach to accepting bids for the activity. After step 202, the facility continues in step 202 to accept the next bid for this activity.

In step 203, the facility populates a group of users performing the activity defined in step 201. This group is also referred to as an "audience," a "segment," or a "population." Such population is typically performed by applying a definition created in step 201 to a body of data reflecting the actions of all users to interact with the subject web site. For example, a facility may use the techniques described in the patent applications referenced above to periodically analyze the contents of a web log and apply one or more activity definitions to populate groups performing the corresponding activities. In some embodiments, these web log contents are extracted in a manner described in U.S. patent application Ser. No. 09/613,403 filed on Jul. 11, 2000, which is hereby incorporated by reference in its entirety. These web logs may be web logs produced by the operator of the subject web site (also called "the publisher"), or may be a web log generated by a third party, such as the operator of the facility, who has been permitted to incorporate inclusion links specifying a URL in their domain into each of the pages of the subject web site, or has been permitted to monitor the interactions of specific users with the subject web site in some other manner. In some cases, rather than periodically processing web logs or other accumulated information about user interactions with the subject web site, the facility may intercept every user interaction with the subject web site in real-time, and reevaluate whether the user should be added to or removed from any of the groups at that point based upon the present interaction. As part of step 203, the facility stores indications of which group each user is a member of in a manner and location conducive to later determining which groups a particular user is a member of when an advertising request is received for that user. These indications may be stored on the computer system on which the facility operates, on the computer system of a third-party ad serving service, or in cookies on each user's client computer system, among other locations. After step 203, the facility continues in step 203 to again populate a group performing the defined activity.

FIG. 3 is a display diagram showing a sample web page that advertisers may use in order to bid on an activity performed by users on the subject web site. The web page 300 includes a set of selection user interface elements for selecting a particular audience, the members of which each have performed a particular activity with respect to the subject web site, here radio buttons 301-303. The user may select one of these radio buttons in order to display additional information about the selected audience, and in order to submit a bid to advertise to the selected audience. Here, radio button 301 has been selected, thereby selecting an Active Home Buyers audience. Accordingly, the page contains additional information 320 about this audience, indicating how the activity to which the audience corresponds is defined, and the current size of the audience. This information may further contain additional aspects of the audience that may assist potential bidders in determining how appropriate this audience is for use in a particular advertising campaign under consideration.

The web page further includes user interface elements 330 for creating and submitting a bid to advertise to the selected audience. These elements include: a bid amount field 331, into which a bidder may enter an amount of money they wish to bid per thousand impressions (that is, presentations) of the advertising message they wish to present; a budget field 332, into which the bidder may enter a maximum amount of money they wish to commit to the bid—after this budget is reached, the bid will be completed, and no fuller advertising messages will be presented in accordance with the bid; an expiration date field 333, into which the bidder may enter a date upon which the bid will expire, and after which no advertising messages will be presented in accordance with the bid; a source of payment field 334, into which the bidder may enter information enabling the operator the facility to charge the bidder for advertising performed in accordance with the bid, such as a credit card number and expiration date, or a number identifying a billing account that the operator of the facility has established for the bidder; and a field 335 into which a bidder may enter information specifying a particular advertising message, such as a URL from which the advertising message can be retrieved; and a submit bid button 336 that the bidder may select after completing bidding fields 331-335 in order to subject a bid for the currently-selected audience.

Those skilled in the art will appreciate that the facility may solicit and receive bids in a variety of other ways, including exchanging email messages or XML documents; interacting via a specialized bidding protocol; or interacting via voice telephone call, using either automatic touch tone or voice response systems or transcription by a human agent, among other approaches. After a bid is received, a node representing the bid is added to a queue data structure corresponding to the particular audience to which the bid was directed. These bid queue data structures are used by the facility to select advertising messages to be presented to audience members.

Figure 4:
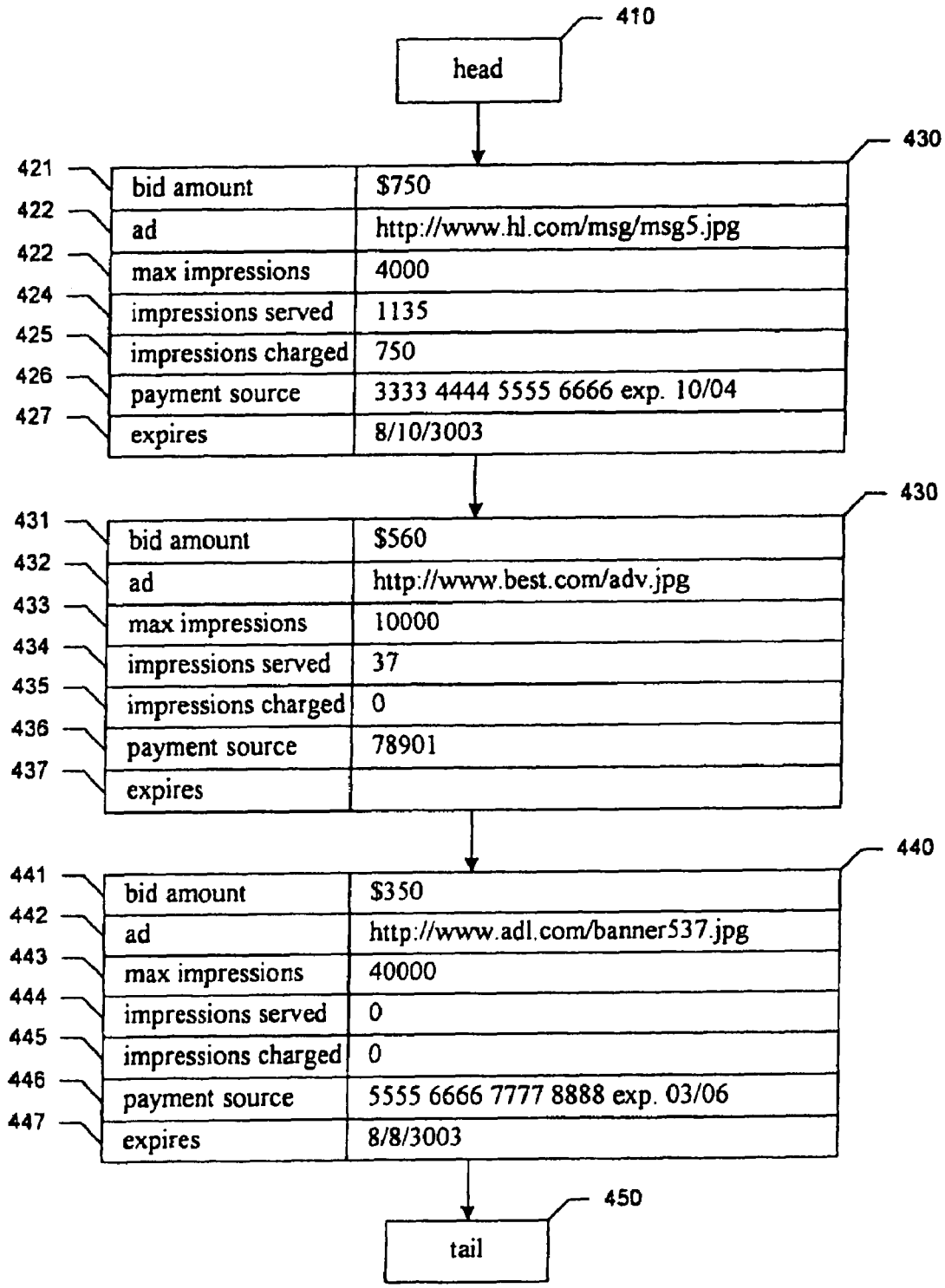
FIG. 4 is a data structure diagram showing a sample bid queue for a particular activity.

FIG. 4 is a data structure diagram showing a sample bid queue for a particular activity. While those skilled in the art will recognize that queue data structures may be arranged in the variety of different manners, the queue data structure shown in FIG. 4 is arranged as a linked list. In the linked list, a special head node 410 points to the top bid node in the list, node 420. This bid node has the highest bid amount of any of the bid nodes in the list: $750. Bid node 420 is linked to bid node 430, which has the second highest bid amount in the list: $560. Bid node 430 is linked to bid node 440, which has the next-lowest bid amount in the queue: $215. Bid node 440 is linked to a special tail node 450 denoting the end of the queue. When a new bid is received, the facility typically inserts a bid node representing the bid into the queue for the audience to which the bid pertains at the point at which the queue continues to be sorted by bid amount. For example, bid node 440 corresponding to the bid submission shown in FIG. 3 is added at the bottom of the queue, since its bid amount is lower than the bid amounts of the previously-submitted bids. In some embodiments, where a new bid is received that has the same bid amount as a previously-received bid having a bid node in the same queue, the bid node for the new bid is added to the bid queue below the existing bid node having the same bid amount.

Each bid node typically contains information used to service the bid that it represents. As an example, bid node 420 contains the following information: in a bid amount field 421, the dollar amount of the bid per thousand impressions, here $750; in an ad field 422, information that can be used to retrieve the advertising message that is the subject of the bid, here a URL; in a maximum impressions field 423, the maximum number of times the advertising message is to be presented in accordance with this bid, here 4,000 times; in an impressions served field 424, the number of times the advertising message has already been presented in accordance with this bid, here 1125; in an impressions charged field 425, the number of served impressions for which the bidder has already been charged, here 750; in a payment source field 426, information usable to charge the bidder for served impressions, here a credit card number and expiration date; and, in an expiration date field 427, the day on which the bid expires, and after which no impressions are to be served in accordance with the bid. The facility's use of bid queues is discussed in detail below in conjunction with FIG. 5.

Figure 5:
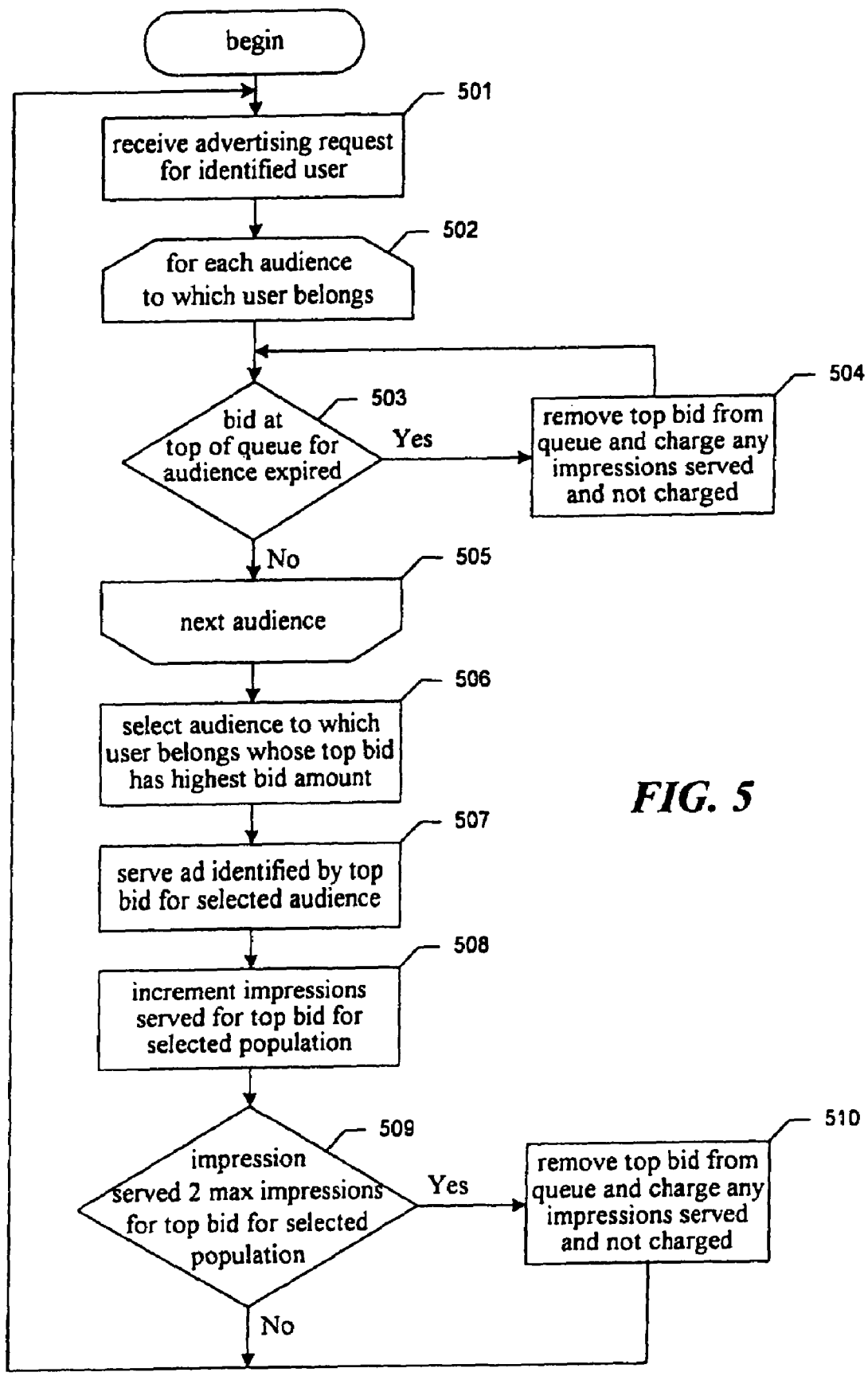
FIG. 5 is a flow diagram showing steps typically performed by the facility in order to select an advertising message to include in a web page that the user has requested from the subject web site.

FIG. 5 is a flow diagram showing steps typically performed by the facility in order to select an advertising message to include in a web page that the user has requested from the subject web site. In step 501, the facility receives an advertising request for an identified user. The received advertising request typically corresponds to that users request for a page of the subject web site. In some embodiments, the facility receives this request by virtue of an inclusion link to the domain of the operator of the facility added by the operator of the subject web site to the page of the web site requested by the user. In steps 502-505, the facility loops through each audience of which the user is a member. (For a user that is not a member of any defined audience, or a user that is only a member of audiences for which there are no active bids, the facility typically displays a default advertising message not associated with the bid for a particular audience (not shown), and omits the remaining steps shown.) In step 503, if the bid at the top of a queue for the current audience is expired—that is, its expiration date has passed—then the facility continues in step 504, else the facility continues in step 505. In step 504, the facility removes the top bid from the current queue, and uses the payment source information to charge the bidder for any impressions that have been served but not yet charged, as reflected by the impressions served and impressions charged field. After step 504, the facility continues with step 503 to examine the new top bid node in the current queue. In step 505, if any other audiences of which the user is a member remain to be processed, then the facility continues in step 502 to process the next audience, else the facility continues in step 506.

In step 506, a facility selects the audience to which the user belongs whose top bid has the highest bid amount. In step 507, the facility serves the advertising message identified in the add field of the top bid node in the queue for the selected audience. In embodiments in which the advertising request received in step 501 was a request in accordance with an inclusion link on the served page of the subject web site, performing step 507 typically involves sending a redirection response to the client computer system that redirects the web client on the client computer system to retrieve this advertising message using the retrieval information stored in the add field of the bid node. In some embodiments, however, some or all of the advertising messages are stored on the computer system on which the facility executes, in which case the facility merely returns a copy of the advertising message to the client computer system directly.

In step 508, the facility increments the value in the impressions served field of the bid node. In step 509, if the value in the impressions served field of the bid node is at least as large as the value in the maximum impressions field of the bid node, then the facility continues instep 510, else the facility continues in step 501 to process the next advertising request. In step 510, the facility removes the top bid from this bid queue, and charges the bidder for any impressions served and not charged as discussed above in conjunction with step 504. After step 510, the facility continues in step 501. In some embodiments, the facility periodically traverses each of the bid queues, charging the bidder associated with each bid node for impressions served and not yet charged that are reflected by that bid node, as described above in conjunction with step 504.

In some embodiments, alternative approaches are used to select the advertising message presented to a particular audience member, such as approaches that provide greater diversity of advertising messages and advertisers to individual users. In one such approach, a bid is selected randomly from the bid queues corresponding to audiences of which the requesting user is a member, weighting each bid for selection based upon its bid amount. In another such approach, each user "traverses" the bids in the bid queue, first receiving the advertising message specified by the top bid in the bid queue, then receiving the advertising message specified by the second bid in the bid queue and so on.

Additional embodiments of the facility employ various other approaches for selecting a bid, or for selecting an advertising message sold using a mechanism other than an auction. For example, in some embodiments, the facility accepts requests to advertise to particular audiences based upon a fixed price, or based upon a price automatically determined with reference to a variety of pricing factors.

In some embodiments, the facility auctions or otherwise sells advertising opportunities corresponding to particular browsing sessions performed at the subject web site by members of a particular audience. In these embodiments, each time a user begins a new visit to the subject web site, the facility chooses an advertiser to sponsor that visit, by (a) identifying the audiences of which the user is a member; (b) identifying all of the bids specifying any of these audiences; (c) determining for each identified bid an expected value representing the anticipated level of advertising revenue that would be produced of the bidder submitting the bid was selected as the sponsor of this visit; (d) selecting the bid having the highest expected value; and (e) during the visit, presenting advertising messages for the sponsor of the visit, without presenting any advertising messages for the submitters of other bids specifying the same audience. In some such embodiments, each bid may specify a maximum number of impressions to present to a user during a session sponsored by the bid. Once this maximum number of impressions per session is reached, the facility selects advertising messages not directed to members of the same audience as the sponsoring bid, such as by presenting advertising messages in accordance with a bid specifying a different audience of which the user is a member, or by displaying advertising messages not associated with any audience-based advertising bid. In some cases, a bid may further specify a maximum number of impressions to be presented to a particular user across all of their visits to the subject web site. In some embodiments, the expected value of a bid is determined by multiplying its per impression or per 1000 impression advertising rate by the smaller of the maximum number of impressions per session specified by the bid and an expected number of impression opportunities. The expected number of impression opportunities may be determined in a variety of ways, including determining the historical average of number of advertising impression opportunities per session of the visiting user, or of a variety of different groups including the visiting user, such as users that are members of one or more audiences of which the visiting user is a member, or all users visiting the subject web site.

It will be appreciated by those skilled in the art that the above-described facility may be straightforwardly adapted or extended in various ways. For example, the facility may be operated by a single organization, or aspects of its functionality may be distributed across multiple organizations. In particular, various functionality may be moved between the operator of the facility, one or more publishers operating one or more subject web sites, and advertisers who are bidding to advertise on the subject web sites. The operator of the facility may use various approaches to directly charging bidders for advertising messages presented in accordance with the bidding process, or may charge these bidders indirectly through one or more intermediaries. Various data structures having variety of forms may be used to support the operation of the facility, as may be various types of computer code, arranged in various modules in various ways. The facility may be used to auction or otherwise sell the opportunity to present virtually any type of advertising message to audiences defined in various ways based upon various kinds of activities. While the foregoing description makes reference to certain preferred embodiments, the scope of the invention is defined solely by the claims that follow and the elements recited therein.

We claim:

1. A method in a computing system for providing online advertising placements, comprising:

receiving a plurality of advertising bids, each advertising bid specifying a distinguished action available for performance by advertising prospects interacting with a subject web site, an advertising message that is to be presented to advertising prospects performing the specified action, a price per impression offered to present the specified advertising message to advertising prospects performing the specified action and a maximum number of impressions of the specified advertising message to be presented to the same advertising prospect during a single visit to the subject web site;

storing the received advertising bids;

receiving an indication that a new visit to the subject web site by a distinguished advertising prospect that has performed the distinguished action has taken place;

determining for each stored advertising bid an expected value obtained by multiplying the price per impression specified by the advertising bid by the smaller of the maximum number of impressions per session specified by the advertising bid and an expected number of advertising opportunities per visit to the subject web site, wherein the stored advertising bid for which the highest expected value is obtained is selected, and wherein the expected number of advertising opportunities per visit to the subject web site is a measured average number of advertising opportunities per visit to the subject web site by all advertising prospects who have performed the specified action;

selecting one of the stored advertising bids based upon a comparison of the price per impression and maximum number of impressions specified by each of the stored advertising bids; and displaying the advertising message specified by the selected advertising bid, selected based on the highest expected value in accordance with the determining step, to the distinguished advertising prospect during the new visit to the subject website.

2. The method of claim 1 wherein the maximum number of impressions specified by the selected advertising bid of the advertising message specified by the selected advertising bid are presented to the distinguished advertising prospect during the new visit to the subject web site.

3. The method of claim 2, further comprising, during the new visit to the subject web site, after the maximum number of impressions specified by the selected advertising bid of the advertising message specified by the selected advertising bid have been presented to the distinguished advertising prospect, presenting to the distinguished advertising prospect an advertising message not specified by any of the stored advertising bid specifying the distinguished action.

4. A computer-readable medium containing computer codes, when executed by a processor, perform the steps of:

receiving a plurality of advertising bids, each advertising bid specifying one of a plurality of actions available for performance by advertising prospects interacting with a subject web site, an advertising message that is to be presented to advertising prospects performing the specified action, a price per impression offered to present the specified advertising message to advertising prospects performing the specified action and a maximum number of impressions of the specified advertising message to be presented to the same advertising prospect during a single visit to the subject web site;

receiving an indication that a new visit to the subject web site by a distinguished advertising prospect that has performed a distinguished action has taken place specified by at least one of the received advertising bids;

determining for each stored advertising bid an expected value obtained by multiplying the price per impression specified by the advertising bid by the smaller of the maximum number of impressions per session specified by the advertising bid and an expected number of advertising opportunities per visit to the subject web site, wherein the stored advertising bid for which the highest expected value is obtained is selected, and wherein the expected number of advertising opportunities per visit to the subject web site is a measured average number of advertising opportunities per visit to the subject web site by all advertising prospects who have performed the specified action;

selecting one of the stored advertising bids based upon a comparison of the price per impression and maximum number of impressions specified by each of the stored advertising bids; and displaying the advertising message specified by the selected advertising bid, selected based on the highest expected value in accordance with the determining step, to the distinguished advertising prospect during the new visit to the subject website.

* * * * *